United States Patent [19]

Schwarz et al.

[11] Patent Number: 5,002,521

[45] Date of Patent: Mar. 26, 1991

[54] DUAL LOAD PATH MOTOR MEANS FOR AIRCRAFT ACTUATION SYSTEMS AND THE LIKE

[75] Inventors: Robert A. Schwarz; David J. Linton, both of Rockford, Ill.

[73] Assignee: Sundstrand Corporation, Rockford, Ill.

[21] Appl. No.: 280,954

[22] Filed: Dec. 7, 1988

[51] Int. Cl.⁵ .............................................. F16H 47/04
[52] U.S. Cl. ........................................ 475/72; 310/83; 310/82
[58] Field of Search ............. 74/665 GA, 665 G, 687, 74/665 F; 244/75 R; 310/80, 82, 83; 475/72, 74

[56] References Cited

U.S. PATENT DOCUMENTS

| | | | |
|---|---|---|---|
| 1,650,911 | 11/1927 | Schneider | 310/83 |
| 1,799,348 | 4/1931 | Apple | 310/82 X |
| 2,857,536 | 10/1958 | Light | 310/82 |
| 3,132,533 | 5/1964 | Baker | 74/687 |
| 3,241,397 | 3/1966 | Wilkinson | 310/83 X |
| 3,306,129 | 2/1967 | De Lalio | 74/687 |
| 3,332,299 | 7/1967 | Allgaier et al. | 74/665 F |
| 3,452,227 | 6/1969 | Welch | 310/82 |
| 3,577,049 | 5/1971 | Madurski et al. | 310/82 X |
| 3,597,998 | 8/1971 | Ebert | 74/687 |
| 3,698,265 | 10/1972 | Williams | 74/665 GA |
| 3,709,061 | 1/1973 | Orshansky, Jr. | 74/687 |
| 3,735,646 | 5/1973 | Roberts | 475/72 |
| 3,796,111 | 3/1974 | Schauer | 74/687 |
| 4,019,404 | 4/1977 | Schauer | 74/687 |
| 4,138,907 | 2/1979 | Melles | 74/687 |
| 4,467,230 | 8/1984 | Rovinsky | 310/83 |
| 4,510,406 | 4/1985 | Morishita | 310/83 X |
| 4,557,160 | 12/1985 | Reynolds | 74/687 |
| 4,655,724 | 4/1987 | Law | 74/665 GA X |
| 4,679,461 | 7/1987 | Mizuguchi et al. | 74/665 GA |
| 4,728,841 | 3/1988 | Sugden | 310/83 X |
| 4,862,027 | 8/1989 | Isozumi et al. | 310/83 X |

FOREIGN PATENT DOCUMENTS

| | | | |
|---|---|---|---|
| 2556875 | 7/1976 | Fed. Rep. of Germany | 74/687 |
| 1036613 | 9/1953 | France | . |

Primary Examiner—Dirk Wright
Attorney, Agent, or Firm—Wood, Phillips, Mason, Recktenwald & Vansanten

[57] ABSTRACT

The problem of providing a dual redundant load path which is not vulnerable to a single point failure at the output of a motor shaft is solved by a dual redundant load path motor system, particularly for use in aircraft actuation systems. A motor (22) has a rotor (34) extending entirely therethrough to define first and second output drives (38 and 40) at opposite ends (34a and 34b) of the rotor. First and second output shafts (46 and 48) are coupled to the opposite ends of the rotor. The output shafts are located at a common end of the motor, and one of the output shafts (48) is coupled through a connecting shaft (68) to the end of the rotor at the opposite end of the motor. The connecting shaft runs generally parallel to the rotor.

5 Claims, 1 Drawing Sheet

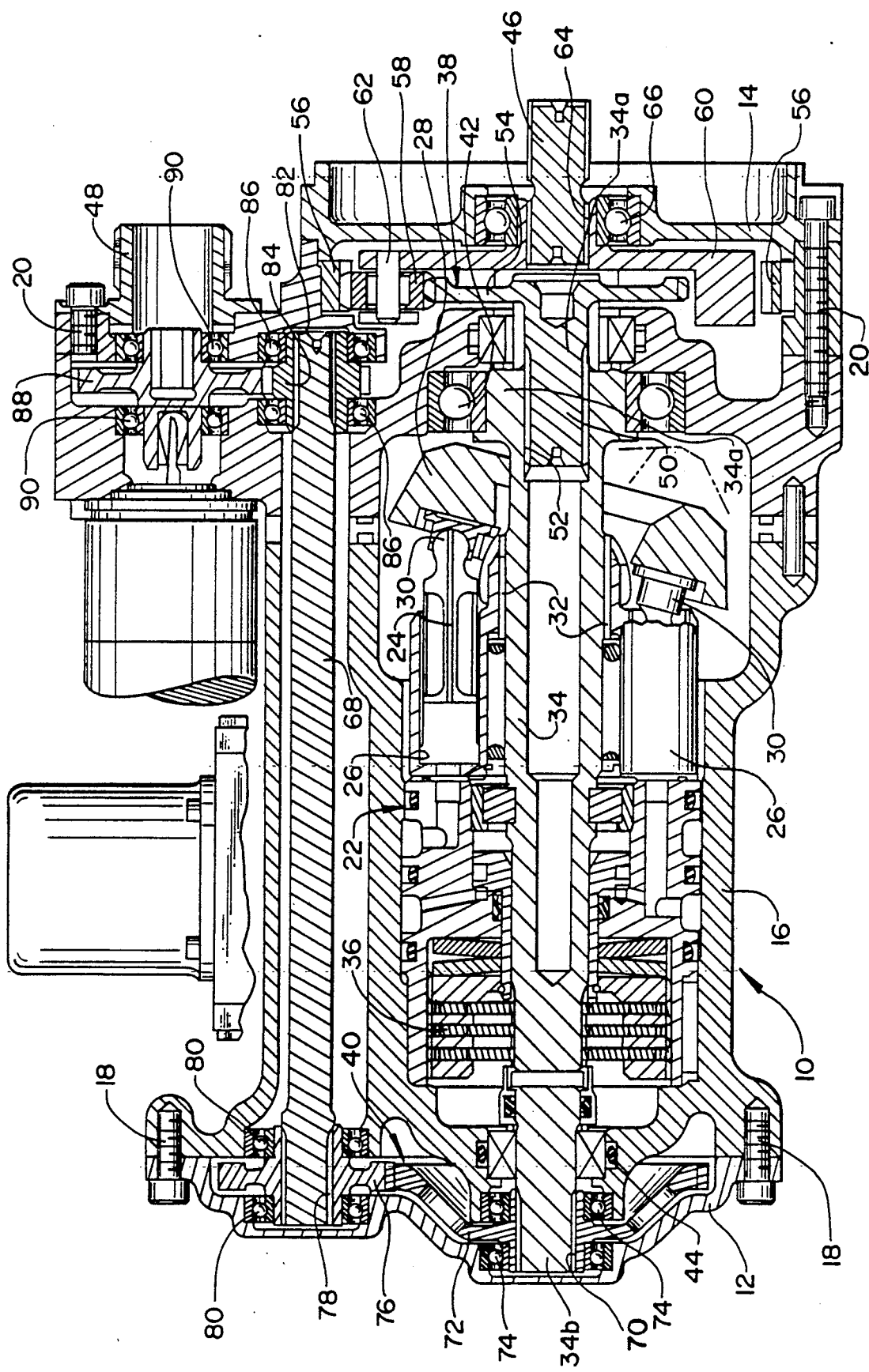

DUAL LOAD PATH MOTOR MEANS FOR AIRCRAFT ACTUATION SYSTEMS AND THE LIKE

FIELD OF THE INVENTION

This invention generally relates to aircraft actuation systems and, particularly, to a dual load path motor means for such systems.

BACKGROUND OF THE INVENTION

Actuation systems are used in aircraft to drive various control surfaces such as the leading edge flap of a power drive unit. Most often, dual redundant load paths are required for safety purposes to allow continued operation of the power drive unit in the event of a single point failure outside the driving motor. In other words, the motor is part of a power drive unit which drives the leading edge flap through a dual load path to a set of actuators. If a failure occurs in one of the load paths, the other load path still is operative to allow driving the leading edge flap.

Heretofore, many configurations of dual redundant load path systems have been proposed to satisfy this need and/or requirement. Typically, a single motor output, such as a single motor shaft, operates the system by driving dual redundant shafting and gearing paths. However, such configurations are vulnerable to a single point failure at the output of the motor shaft itself. This would free the control surface and create possible safety problems in flight conditions.

This invention is directed to solving such problems, and particularly to the problem of single point failure at the output of the motor shaft in dual redundant load path systems.

SUMMARY OF THE INVENTION

An object, therefore, of the invention is to provide a dual redundant load path motor means for aircraft actuation systems and the like.

Generally, in the exemplary embodiment of the invention, a motor has a first output drive means at one end of the motor. First coupling means are provided on the first output drive means for operatively connecting the drive means to one end of an appropriate dual redundant actuation system. The motor includes a second output drive means at an opposite end of the motor. Second coupling means are provided on the second output drive means for operatively connecting the drive means to an opposite end of the dual redundant actuation system.

As disclosed herein, the system includes first and second output shaft means located at a common end of the motor. The first output shaft means is coupled, through gearing, to the first output drive means at the one end of the motor. The second output shaft means is coupled, through gearing, to an end of a connecting shaft running generally parallel to a line through the ends of the motor. The opposite end of the connecting shaft is coupled, through gearing, to the second output drive means at the opposite end of the motor. Therefore, although the motor has output drive means at each opposite end thereof, such as at opposite ends of a rotor extending through the motor, the dual redundant load paths effectively are driven from only one end of the motor.

Other objects, features and advantages of the invention will be apparent from the following detailed description taken in connection with the accompanying drawings.

BRIEF DESCRIPTION OF THE DRAWING

The features of this invention which are believed to be novel are set forth with particularity in the appended claims. The invention, together with its objects and the advantages thereof, may be best understood by reference to the following description taken in conjunction with the accompanying drawing, in which the single Figure is an axial section through the dual redundant load path motor means of the invention.

DETAILED DESCRIPTION OF THE PREFERRED EMBODIMENT

Referring to the drawing in greater detail, the dual redundant load path motor means of the invention includes a housing, generally designated 10. The housing encases most of the operative components of the system and includes end caps 12 and 14 secured to a main housing 16 by appropriate fastening means 18 and 20, respectively.

A motor, generally designated 22, is mounted within housing 10. The motor, generally, is conventional and in the form of a variable displacement hydraulic motor. Suffice it to say, the hydraulic motor 22 includes pistons 24 displaceable within cylinders 26, with the strokes of the pistons being governed or varied by a conventional wobbler plate 28. Universal joint means 30 couple the wobbler plate to the pistons. Cylinders 26 are splined, as at 32, to a rotor 34 extending axially entirely through the motor, for rotating the rotor in driving fashion. As is conventional, the motor includes a brake means, generally designated 36, shown of the interleaved disk type.

As stated, hydraulic motor 22 rotates rotor 34. The invention contemplates that the rotor extend entirely through the motor to define a first drive means, generally designated 38, at one end of the motor and a second drive means, generally designated 40, at the opposite end of the motor. One end 34a of rotor 34 is journaled in the housing by bearing means 42, and the opposite end 34b of the rotor is journaled within the housing by bearings 44. Therefore, it can be understood that opposite ends of rotor 34 effectively can drive two distinct load paths, as described in greater detail below.

A feature of the invention is that the dual load paths be driven from one common end of the motor means, namely one end of housing 10. More particularly, first and second output shafts 46 and 48, respectively, can be seen at the right-hand end of the drawing. Specifically, first output drive means 38 includes rotor end 34a splined to a stub shaft 50 as at 52, for rotation therewith. The stub shaft is coupled to first output shaft 46 by means of a planetary gearset which includes a sun gear 54 integral with stub shaft 50. A ring gear 56 is fixed within the motor housing. One or more planetary gears 58 are disposed in mesh with sun gear 54 and ring gear 56. The planetary gear(s) is mounted on a carrier 60 by means of a pin 62, such that orbital rotary motion of the planetary gear(s) rotates carrier 60. The carrier is splined, as at 64, to first output shaft 46. Bearing means 66 are provided between carrier 60 and housing end cap 14.

From the foregoing, it can be understood that driving rotation of rotor 34 rotates first output shaft 46 by means of the first output drive means 38, including rotor end 34a coupled through the planetary gearset to the first output shaft.

In order to drive second output shaft 48 from the same end of the motor means as first output shaft 46, but by means of the opposite end 34b of rotor 34 at the opposite end of the motor, a connecting shaft 68 is disposed within housing 10 and runs generally parallel to rotor 34. Rotor end 34b is splined, as at 70, to a crown gear 72 journaled within the housing by bearing means 74. Gear 72 is in mesh with a spur gear 76 splined, as at 78, to one end of parallel connecting shaft 68. Gear 76 is journaled within the housing by bearing means 80. Therefore, it can be seen that driving rotation of rotor 34 rotates connecting shaft 68 through gear means 72,76 coupling rotor end 34b to one end of the connecting shaft.

The opposite end of connecting shaft 68 is splined, as at 82, to a gear 84 journaled within the housing by bearing means 86. Gear 84 is in mesh with a gear 88 journaled within the housing by bearing means 90. Gear 88 is formed integral with second output shaft 48. Therefore, it can be seen that second output shaft 48, at the same end of the unitary motor means as first output shaft 46, is driven by rotor end 34b at the opposite end of the motor means.

From the foregoing description, the redundancy of the motor means should be apparent. Should a single point failure occur anywhere in the first output drive means 38 between rotor end 34a and first output shaft 46, the rotor still will drive second output shaft 48 through the opposite end 34b of the rotor through gears 72 and 78, parallel connecting shaft 68 and gears 84 and 88. Conversely, should a single point failure occur in the second output drive means 40 at the opposite end of motor 22 or at any other point between the rotor and second output shaft 48, first output shaft 46 still will be driven by first output drive means 38 including the described planetary gearset.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A dual redundance load path motor means for aircraft actuation systems or the like, comprising:
    a single prime moving motor for drivingly rotating a rotor which extends axially through the motor and defines first and second output drive means at opposite ends of the motor;
    first output shaft means;
    first coupling means between the first output drive means at one end of the rotor and the first output shaft means;
    second output shaft means; and
    second coupling means between the second output drive means, wherein said first and second output shaft means are at the same axial end of the motor at an opposite end of the rotor and the second output shaft means.

2. The dual redundant load path motor means of claim 1 wherein the coupling means on at least one of said first and second output drive means include gear means.

3. The dual redundant load path motor means of claim 1 wherein one of said first and second output shaft means is coupled to an end of a connecting shaft running parallel to said rotor.

4. A dual redundant load path motor means for aircraft actuation systems or the like, comprising:
    a single prime moving motor for drivingly rotating a rotor which extends axially through the motor;
    first output shaft means at one end of the motor;
    first coupling means between the first output shaft means and one end of the rotor at said one end of the motor;
    second output shaft means at said one end of the motor; and
    second coupling means between the second output shaft means and an opposite end of the rotor at the opposite end of the motor, including a connecting shaft running generally parallel to the rotor, wherein said first and second output shaft means are at the same axial end of the motor.

5. The dual redundant load path motor means of claim 4 wherein said second coupling means include gear means at opposite ends of said connecting shaft.

* * * * *